United States Patent
Hammerle

(10) Patent No.: US 6,225,771 B1
(45) Date of Patent: May 1, 2001

(54) PROBE CHORD ERROR COMPENSATION

(75) Inventor: R. David Hammerle, Blue Ash, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/452,205

(22) Filed: Dec. 1, 1999

(51) Int. Cl.$^7$ .................................................. G05B 19/408
(52) U.S. Cl. ...................................... 318/568.22; 700/176
(58) Field of Search .............................. 318/568.22, 567, 318/569, 572; 700/176

(56) References Cited

U.S. PATENT DOCUMENTS

| | | | |
|---|---|---|---|
| 4,384,332 | * 5/1983 | McMurtry | 364/474 |
| 4,541,054 | * 9/1985 | Peck et al. | 364/474 |
| 4,554,495 | * 11/1985 | Davis | 318/572 |
| 4,561,058 | * 12/1985 | McMurtry | 364/474 |
| 4,617,503 | * 10/1986 | Davis et al. | 318/572 |
| 4,875,177 | * 10/1989 | Jarman | 364/559 |
| 5,095,788 | * 3/1992 | Matoni | 82/118 |
| 5,101,572 | * 4/1992 | Kwong et al. | 33/3 |
| 5,309,646 | * 5/1994 | Randolph, Jr. et al. | 33/502 |
| 5,329,457 | * 7/1994 | Hemmerle et al. | 364/474.35 |
| 5,357,450 | 10/1994 | Hemmerle et al. | 364/551.01 |
| 5,373,222 | 12/1994 | Hemmerle et al. | 318/652 |

* cited by examiner

Primary Examiner—Robert E. Nappi
Assistant Examiner—Rina I. Duda
(74) Attorney, Agent, or Firm—Andrew C. Hess; Gerry S. Gressel

(57) ABSTRACT

Probe chord error compensation is provided in a machine tool including a rotary member for supporting a work piece and a probe having a path of travel. The compensation is accomplished by using the probe to measure an observed diameter of the work piece and then determining the crossover error of the machine tool. The observed diameter and the crossover error are then used to compute the work piece's actual diameter, thereby compensating for any probe chord error.

11 Claims, 3 Drawing Sheets

US 6,225,771 B1

PROBE CHORD ERROR COMPENSATION

BACKGROUND OF THE INVENTION

This invention relates generally to CNC machine tools and more particularly to automated error compensation in such machines.

Rotary work piece machine tools, such as horizontal lathes and vertical turning lathes, are commonly used to machine and produce parts in an efficient and repeatable manner. In machining such parts, it is often necessary to measure certain machined dimensions to assure the accuracy of the part's dimensions. Traditionally, turned work piece diameters have been measured using manual gauges such as micrometers, vernier gauges and other types of bridge gauges. These gauges are manually employed by the machine operator and are positioned by feel and/or by observation of an indicator to establish the on center condition. However, these manual operations are time consuming, use costly gauges and are dependent on the individual operator's skill level. This serves to limit the capacity of the machine tool and drives up the cost of producing the parts. Furthermore, all such manual operations are prone to introducing errors into the machining process.

To avoid these drawbacks, improved approaches to machine gauging have been sought. One such approach is known as "on machine probing." On machine probing employs a sensor, such as a touch trigger type displacement probe, to probe machined surfaces of the work piece. The probe is mounted into the machine tool's tool holding structure and uses its axis and positioning feedback system to determine various work piece dimensions. However, if the centerline of the probe does not crossover the work piece's centerline axis of rotation as it moves along its path of travel, then the probing will not measure the true diameter, but a non-diametrical chord of the work piece. The difference between the true diameter and a non-diametrical chord is referred to herein as the "probe chord error."

To contain the probe chord error within acceptable limits, the path of travel of the probe's centerline needs to be set to a specific tolerance and frequently monitored to maintain the tolerance. This can be a difficult and time consuming task. One approach for automating the monitoring aspect is described in U.S. Pat. No. 5,373,222 issued December 13, 1994 to R. David Hemmerle et al. This patent describes a methodology for rapidly evaluating the probe's crossover error, i.e., the displacement of the probe's path of travel from the work piece's centerline axis of rotation. However, once the crossover error is determined, the probe's path of travel alignment has to be manually adjusted so that the crossover error is within tolerance. To minimize measurement accuracy loss due to crossover error, a tight tolerance and frequent evaluations and adjustments are required. This requires special vigilance and skill in setting, and consumes maintenance and machine time.

Accordingly, there is a need for a method of automatically compensating for probe chord error that does not require frequent probe adjustments.

BRIEF SUMMARY OF THE INVENTION

The above-mentioned need is met by the present invention which provides probe chord error compensation in a machine tool including a rotary member for supporting a work piece and a probe having a path of travel. The compensation is accomplished by using the probe to measure an observed diameter of the work piece and then determining the crossover error of the machine tool. The observed diameter and the crossover error are then used to compute the work piece's actual diameter, thereby compensating for any probe chord error.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
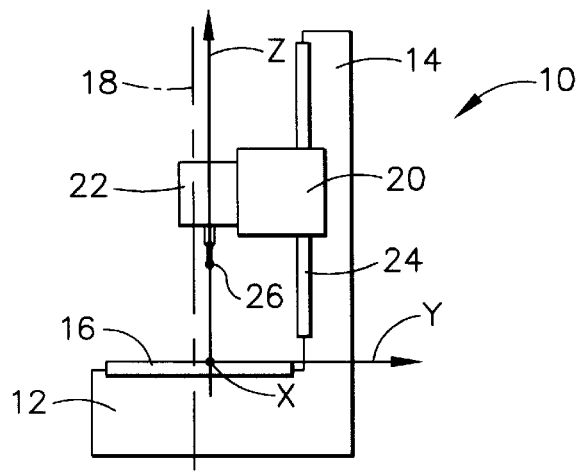
FIG. 1 is a side view of a vertical turning lathe.

Referring to the drawings wherein identical reference numerals denote the same elements throughout the various views, FIG. 1 shows a computer numerically controlled (CNC) machine tool 10 in the form of a vertical turning lathe. The lathe 10 operates on a coordinate axis system having an X-axis and an Y-axis direction oriented horizontally and a Z-axis oriented vertically. As shown in FIG. 1, the X-axis extends in and out of the plane of the paper.

The lathe 10 includes a base 12 to which a vertical column 14 is attached. A rotary table 16 is supported on the base 12 for rotation about a centerline axis of rotation 18 and provides the support for work pieces (not shown in FIG. 1) to be machined. The lathe 10 has a carrier 20 to which a ram 22 is mounted. The carrier 20 is sildably mounted above the rotary table 16 to one or more vertical rails 24 that are mounted on the column 14. Thus, the carrier 20 can be moved vertically, along the Z-axis, towards or away from a work piece clamped to the rotary table 16. The ram 22 is slidably mounted to the carrier 20 for linear movement back-and-forth along the X-axis. The machine tool's CNC processor (not shown in FIG. 1) controls the movement of the carrier 20 and ram 22. The carrier 20 and ram 22 do not have movement capability in the Y-axis direction.

The vertical turning lathe 10 is being used herein as an example to facilitate disclosure of the present invention. However, it should be noted that the method of the present invention is not limited to vertical turning lathes. Indeed, the present invention is applicable to a wide variety of rotary work piece machine tools.

The ram 22 is adapted to receive various cutting tools, measuring devices and probes used in the machining process. The lathe 10 as shown in FIG. 1 has a sensing probe 26 inserted in the ram 22. One type of probe that is suitable for use as the probe 26 is a conventional touch trigger type of displacement probe, although other types of probes could be used as well.

During machining, an appropriate tool is inserted into the ram 22, and a work piece is clamped onto the rotary table 16, centered with respect to the centerline axis 18. The table 16, and hence the work piece, is caused to rotate relative to the tool, which is moved into the work piece to perform a turning operation. At some point in the operation, it becomes necessary to measure a dimension of the work piece. To do this, the tool is replaced with the probe 26.

Figure 2:
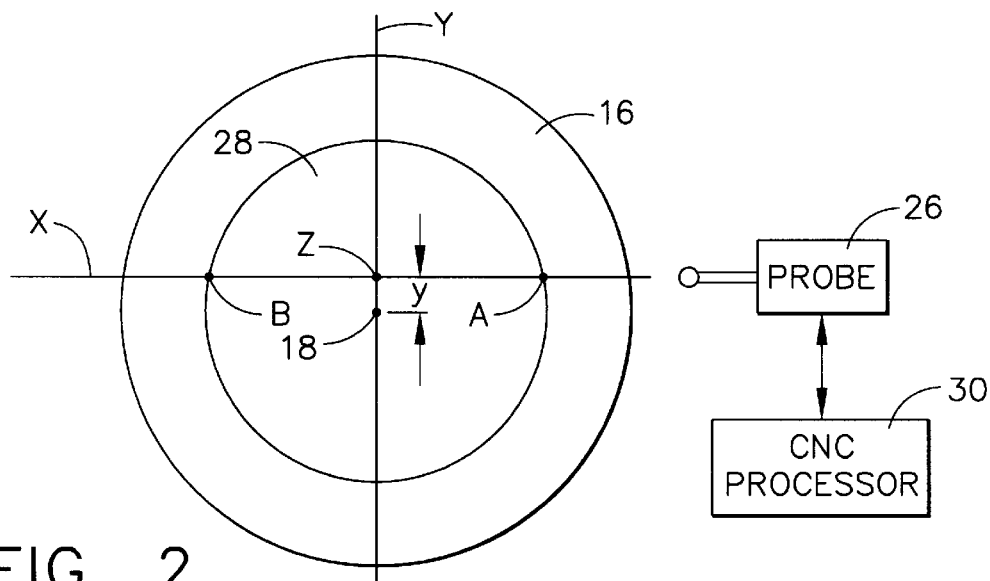
FIG. 2 is a top view of the rotary table of the vertical turning lathe showing a diameter measurement.

FIG. 2 schematically shows how the diameter of a cylindrical work piece 28 mounted on the table 16 is measured. The probe 26 is moved along the X-axis until it contacts the work piece 28 at a point A on a first side thereof. The contact of the probe 26 against the work piece 28 triggers the probe 26 to send a signal to the CNC processor 30, and the X-axis position of point A is stored in the CNC processor 30. The probe 26 is then moved into contact with the opposite side of the work piece 28 at a point B on the X-axis. The X-axis position of point B is also stored in the CNC processor 30. The CNC processor 30 then uses the two stored position values to determine the observed diameter of the work piece 28. However, as shown in FIG. 2, the probe's path of travel along the X-axis can become offset in the Y direction from the centerline axis 18, due to various conditions such as geometrical distortions resulting from self-induced and process-induced heat. The Y direction distance, y, between the probe's path of travel (the X-axis) and the centerline axis 18 is known as the crossover error. Because of crossover error, the probe 26 does not crossover the centerline axis of rotation 18 as it is moved along its path of travel. Thus, the observed diameter measured by the probe 26 is not indicative of the work piece's true diameter, but instead is equal to a non-diametrical chord length of the work piece 28. The difference between the true diameter and the non-diametrical chord length is referred to herein as the "probe chord error."

Figure 3:
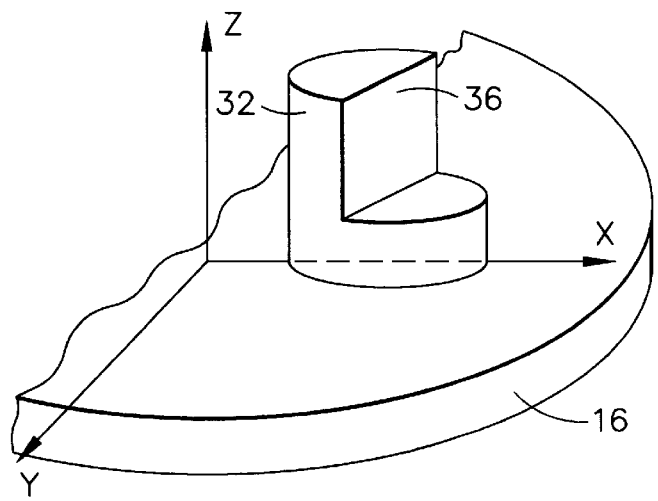
FIG. 3 is a perspective view of a datuming device used in the present invention.

The present invention provides for automatic compensation of probe chord error. The first step of the process is to determine the crossover error for the lathe 10. The crossover error is determined using two datuming devices 32 and 34, one of which is shown in FIG. 3. In one preferred embodiment, the datuming device 32 is a pin member having a planar reference surface 36 formed thereon. The planar reference surface 36 is oriented vertically so as to be parallel to the longitudinal axis of the pin member. Although not shown in FIG. 3, the second datuming device 34 is substantially identical to the first datuming device 32 in that it is also a pin member having a planar reference surface 36 formed thereon.

Figure 4:
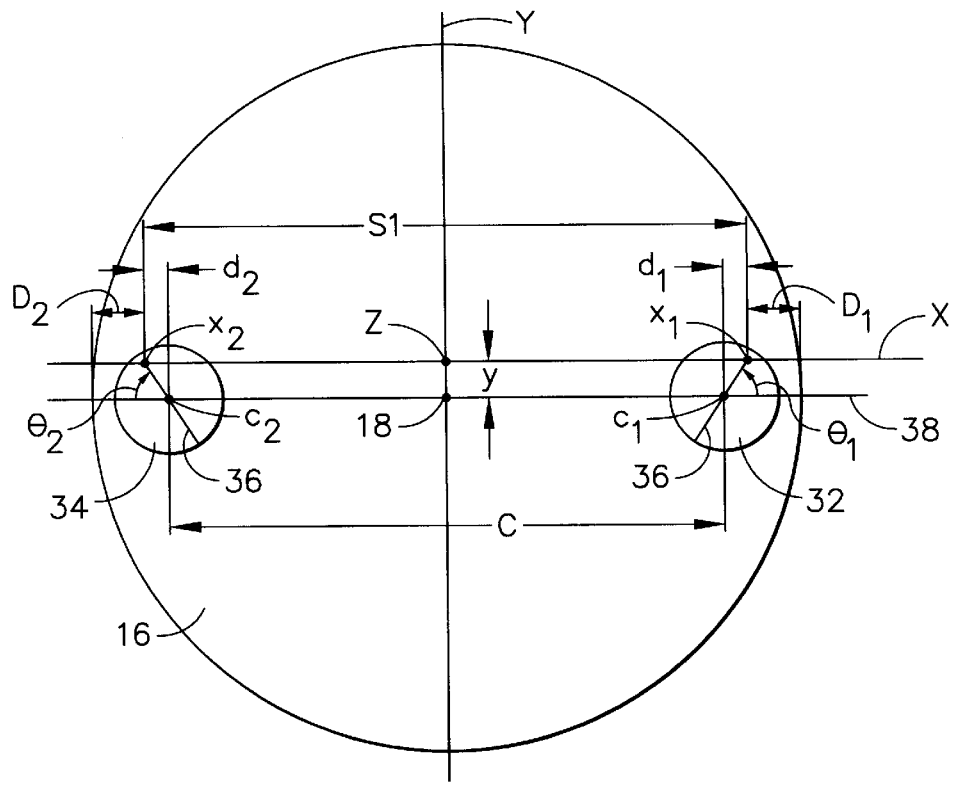
FIG. 4 is a top view of the rotary table having two datuming devices mounted thereon.

As shown in FIG. 4, the first datuming device 32 is installed on one side of the rotary table 16, and the second datuming device 34 is installed on the opposite side of the table 16. Although shown as being directly mounted on the rotary table 16, the datuming devices 32 and 34 could alternatively be indirectly mounted to the table 16 via another rotatable reference member such as the work piece 28 or a fixture for holding the work piece 28. In any event, the datuming devices 32 and 34 are situated so that both reference surfaces 36 intersect both the X-axis and a line 38 which is parallel to the X-axis and intersects the centerline axis of rotation 18. The linear distance, y, in the Y direction between the line 38 and the X-axis is thus equal to the crossover error. The reference surfaces 36 of the first and second datuming devices 32 and 34 are arranged at angles of $\theta_1$ and $\theta_2$, respectively, with respect to the X-axis. Preferably, both angles $\theta_1$ and $\theta_2$ are equal to 45 degrees although some variance is allowed.

Figure 5:
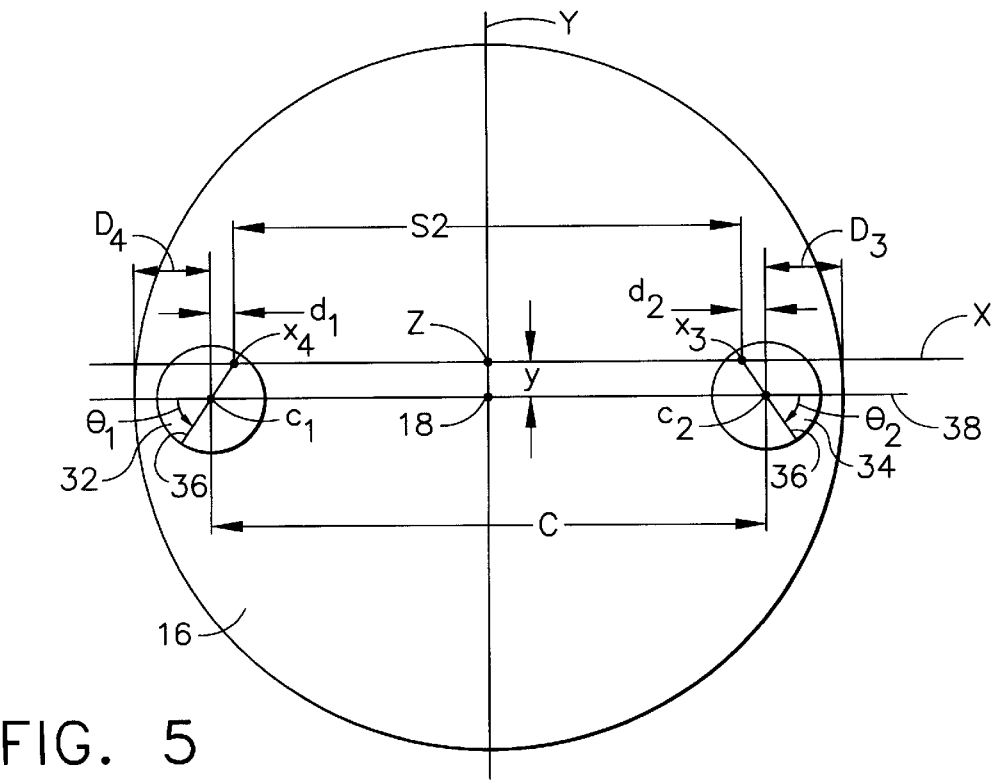
FIG. 5 is a top view of the rotary table rotated 180 degrees with respect to the view in FIG. 4.

With the datuming devices 32 and 34 so positioned, the probe 26 is moved along the X-axis until it contacts the reference surface 36 of the first datuming device 32. The probe 26 captures this strike position as $x_1$, which value is stored in the CNC processor 30. The probe is then moved into contact with the reference surface 36 of the second datuming device 34, and the corresponding strike position is stored in the CNC processor 30 as $x_2$. The rotary table 16 is then rotated 180 degrees so that the datuming devices 32 and 34 are on opposite sides of the centerline axis 18, as shown in FIG. 5. The reference surfaces 36 of the two datuming devices 32 and 34 are again probed, with the strike position of the second datuming device 34 being stored in the CNC processor 30 as $X_3$ and the strike position of the first datuming device 32 being stored in the CNC processor 30 as $x_4$. With the four strike position values stored, the CNC processor 30 can calculate the strike position spreads (i.e., the distance between the strike positions) for each position of the table 16. Specifically, the first spread S1 is equal to $x_1-x_2$, and the second spread S2 is equal to $X_3-X_4$.

The line 38 intersects the reference surface 36 of the first datuming device 32 at a first point $C_1$ and the reference surface 36 of the second datuming device 34 at a second point $C_2$. Because the reference surfaces 36 are angled with respect to the X-axis and not perpendicular thereto, a linear distance $d_1$ in the X direction exists between point $C_1$ and strike point $x_1$, and a linear distance $d_2$ in the X direction exists between point $C_2$ and strike point $X_2$. After the table 16 is rotated 180 degrees as shown in FIG. 5, the same distance $d_1$ in the X direction exists between point $C_1$ and strike point $X_4$, and the same distance $d_2$ in the X direction exists between point $C_2$ and strike point $X_3$.

Furthermore, the two points $C_1$ and $C_2$ are separated in the X direction by a distance C. In the first table position, $C=S1-d_1-d_2$ and in the second table position $C=S2+d_1+d_2$. Because line 38 intersects the axis of rotation 18, the distance C remains constant as the table 16 is rotated. Thus, it is known that:

$$S1-d_1-d_2 = S2+d_1+d_2, \text{ and therefore}$$

$$S1-S2 = 2(d_1+d_2).$$

From the geometrical relationships shown in FIGS. 4 and 5, it is known that:

$$d_1 = y \tan(90-\theta_1) \text{ and } d_2 = y \tan(90-\theta_2).$$

Substituting these relationships into the above equation and solving for y gives:

$$y = \frac{S1-S2}{2(\tan(90-\theta_1)+\tan(90-\theta_2))}$$

where y is equal to the crossover error. When $\theta_1$ and $\theta_2$ are both equal to 45 degrees, the equation can be simplified to:

$$y = \frac{S1-S2}{4}.$$

Figure 6:
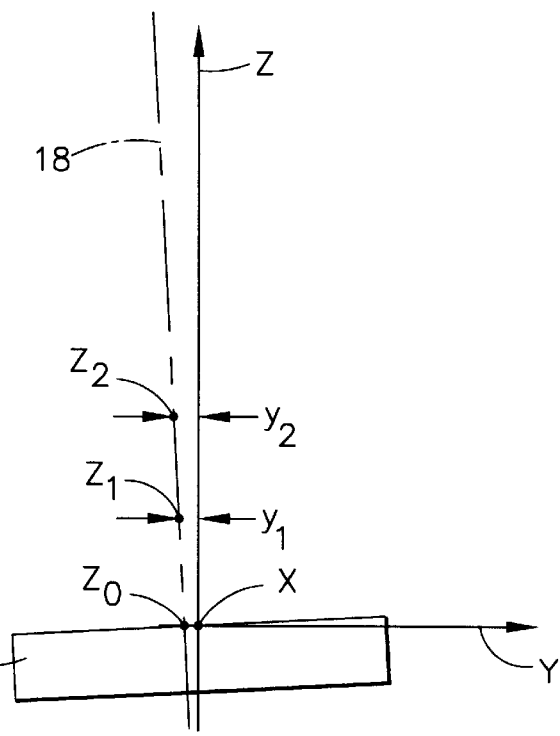
FIG. 6 is a side view of the rotary table showing the nonparallelism of the table's axis of rotation with respect to the Z-coordinate axis.

In addition to being offset from the Z-axis, it is possible that the centerline axis of rotation 18 could be not parallel to the Z-axis as shown in FIG. 6. Such nonparallelism means that the crossover error will vary as a function of the Z-axis position. To determine the crossover error in such situations, the slope of the axis of rotation must be determined. This can be accomplished by determining the crossover error at two know Z-axis positions $z_1$ and $z_2$. That is, the above described process is performed at Z-axis position $z_1$ to determine the corresponding crossover error $y_1$ and again at Z-axis position $Z_2$ to determine the corresponding crossover error $y_2$. The slope is thus defined as the change in the crossover error divided by the change in the Z-axis position. Expressed in equation form, the slope SL is:

$$SL = \frac{y_2 - y_1}{z_2 - z_1}.$$

It is next necessary to determine the intercept crossover error, i.e., the crossover error at the zero Z-axis position. The intercept crossover error $y_0$ can be determined using one of the measured crossover error values and the calculated slope as follows:

$$y_0 = y_1 - z_1 SL.$$

Once the slope SL and the intercept crossover error $y_0$ are known, the crossover error at any given Z-axis position n can be determined using the equation:

$$y_n = y_0 + z_n SL.$$

The foregoing provides one preferred method of quickly determining the crossover error. There are, however, other known approaches of determining crossover error that could be used in the probe chord compensation scheme of the present invention. For instance, the above-mentioned U.S. Pat. No. 5,373,222 discloses another method of determining crossover error using a single datuming device. But the two datuming device methodology described above has the advantage of providing capability of verifying that the table 16 is rotated precisely 180 degrees.

This is accomplished by determining the drop for each datuming device 32 and 34 at each table position. As used herein, the drop of a datuming device refers to the X direction distance between the device's strike position and the point where the X-axis intersects with the outer edge of the rotary table 16. Thus, as seen in FIG. 4, the drops for the first and second datuming devices 32 and 34 in the first table position are D1 and D2, respectively. And as seen in FIG. 5, the drops for the first and second datuming devices 32 and 34 in the second table position are D4 and D3, respectively. The X-axis positions of the table outer edge are detected by the probe 26 and stored in the CNC processor 30. The outer edge of table 16 provides a non-sensitive reference surface in that it does not exhibit a changing X-axis displacement while the table 16 is rotated. Thus, if the sum of the two drops before rotation equals the sum of the two drops after rotation (i.e., D1+D2=D3+D4), then it is assured that the table has been rotated precisely 180 degrees.

Figure 7:
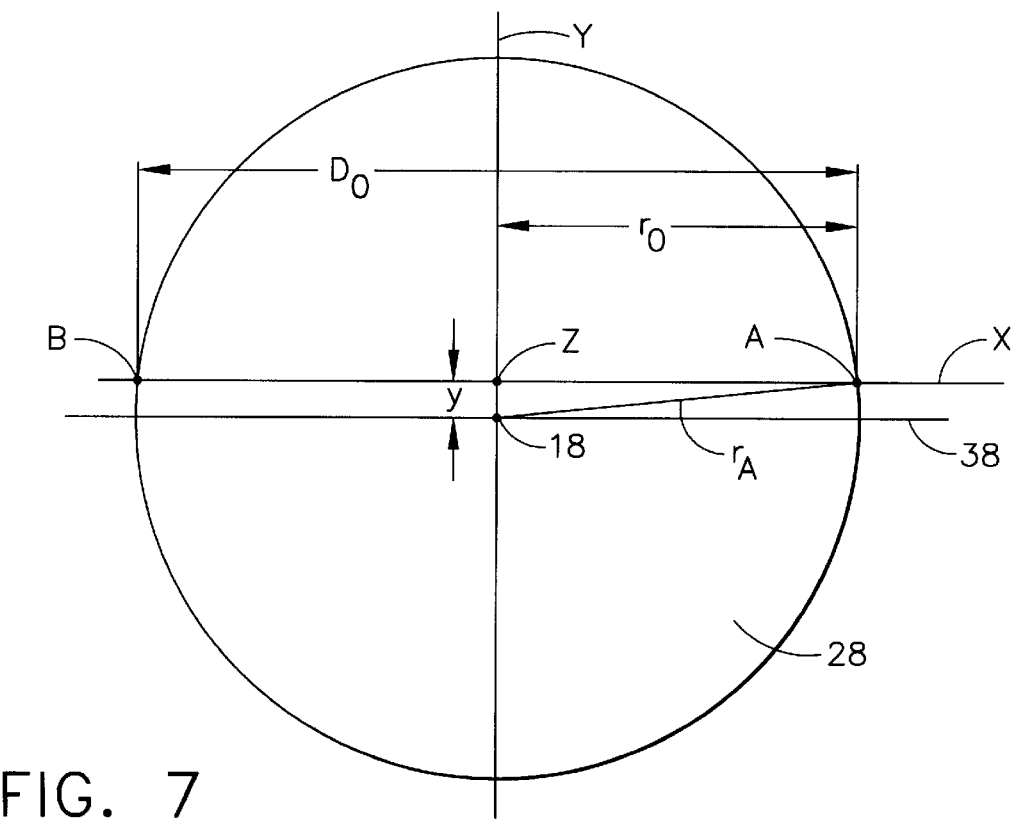
FIG. 7 is a top view of a machined work piece showing the geometrical relationships used to calculate an actual diameter.

Once the crossover error has been determined, the CNC processor 30 is able use this value and the observed work piece diameter measured by the probe 26 to determine the actual diameter of the work piece 28. The calculation is explained referring to FIG. 7 which shows the work piece 28, the observed diameter $D_0$ (i.e., the chord length between points A and B as described above in reference to FIG. 2) and the actual diameter $D_a$. Because point A is located on the circumference of the work piece, a line extending between the centerline axis 18 and point A defines the actual radius $r_a$ of the work piece 28. As shown in FIG. 7, the radius $r_a$, the Y direction distance y, which is the crossover error, and the chord radius $r_o$, which is half of the observed diameter $D_o$, define a right triangle. Thus, applying the Pythagorean Theorem gives:

$$r_a^2 = r_o^2 + y^2 \quad \text{and} \quad D_a = \sqrt{D_o^2 + 4y^2}.$$

In instances where the centerline axis of rotation 18 has a slope SL relative to the Z-axis, the actual diameter $D_a$ can be given by the equation:

$$D_a = \sqrt{D_o^2 + 4y_m^2}$$

where $y_m$ is the crossover error at the Z-axis position of measurement, $z_m$. As discussed above, the crossover error at the Z-axis position of measurement $z_m$ can be determined with the equation:

$$y_m = y_o + z_m SL$$

Accordingly, the actual diameter of the work piece 28 can be determined from the observed diameter as measured by the probe 26 and the calculated crossover error. By programming the CNC processor 30 to make this calculation, the lathe 10 is capable of automatic compensation for probe chord error. The automatic probe chord error compensation of the present invention minimizes machine evaluations and adjustments and permits a larger probe path tolerance. Improved measuring accuracy is achieved and maintained substantially independently of the probe's alignment. Also, the initial probe set up time is reduced.

While specific embodiments of the present invention have been described, it will be apparent to those skilled in the art that various modifications thereto can be made without departing from the spirit and scope of the invention as defined in the appended claims.

What is claimed is:

1. In a machine tool including a rotary member for supporting a work piece and a probe having a path of travel, a method of compensating for probe chord error comprising the steps of:
    using said probe to measure an observed diameter of said work piece;
    determining said machine tool's crossover error; and
    computing an actual diameter of said work piece from said observed diameter and said crossover error.

2. The method of claim 1 wherein said actual diameter is computed using the equation:

$$D_a = \sqrt{D_o^2 + 4y^2}$$

where $D_a$ is said actual diameter, $D_o$ is said observed diameter and y is said crossover error.

3. The method of claim 1 wherein said step of determining said machine tool's crossover error comprises:
    installing a first datuming device having a reference surface on one side of said rotary member and a second datuming device having a reference surface on another side of said rotary member;
    probing said reference surface of said first datuming device and said reference surface of said second datuming device to measure a first spread between said reference surfaces along said probe's path of travel;
    rotating said rotary member 180 degrees;

then probing said reference surface of said first datuming device and said reference surface of said second datuming device to measure a second spread between said reference surfaces along said probe path of travel; and computing said crossover error from said first and second spreads.

4. The method of claim 3 wherein said reference surfaces are both arranged at a 45 degree angle with respect to said probe path of travel.

5. In a computer numerically controlled machine tool including X, Y and Z coordinate axes, a rotary member for supporting a work piece and having an axis of rotation, a probe moveable along said X and Z axes, and a processor, a method of compensating for probe chord error comprising the steps of:

moving said probe along said X-axis to measure an observed diameter of said work piece;

storing said observed diameter in said processor;

determining said machine tool's crossover error;

storing said crossover error in said processor; and computing an actual diameter of said work piece from said observed diameter and said crossover error.

6. The method of claim 5 wherein said actual diameter is computed using the equation:

$$D_a = \sqrt{D_o^2 + 4y^2}$$

where $D_a$ is said actual diameter, $D_o$ is said observed diameter and y is said crossover error.

7. The method of claim 5 wherein said step of determining said machine tool's crossover error comprises:

installing a first datuming device on one side of said rotary member, said first datuming device having a reference surface arranged to intersect said X-axis;

installing a second datuming device on another side of said rotary member, said second datuming device having a reference surface arranged to intersect said X-axis;

probing said reference surface of said first datuming device and said reference surface of said second datuming device to measure a first spread between said reference surfaces along said X-axis;

storing said first spread in said processor;

rotating said rotary member 180 degrees;

then probing said reference surface of said first datuming device and said reference surface of said second datuming device to measure a second spread between said reference surfaces along said X-axis;

storing said second spread in said processor; and computing said crossover error from said first and second spreads.

8. The method of claim 7 wherein said reference surfaces are both arranged at a 45 degree angle with respect to said X-axis.

9. The method of claim 5 further comprising determining crossover error values at two different Z-axis positions and using said crossover error values to determine a slope of said axis of rotation relative to said Z-axis.

10. The method of claim 9 wherein said actual diameter is computed using the equation:

$$D_a = \sqrt{D_o^2 + 4y_m^2}$$

where $D_a$ is said actual diameter, $D_o$ is said observed diameter and $y_m$ is said crossover error at the Z-axis position of measurement.

11. The method of claim 10 wherein said crossover error at the Z-axis position of measurement is determined using the equation:

$$y_m = y_o + Z_m SL$$

where $y_m$ is said error at the Z-axis position of measurement, $y_0$ is the crossover error at the zero Z-axis position, $Z_m$ is the Z-axis position of measurement, and SL is said slope of said axis of rotation relative to said Z-axis.

* * * * *